3,389,749
PROCESS FOR MOLDING FLUOROCARBON RESIN MATERIAL TO AN ARTICLE

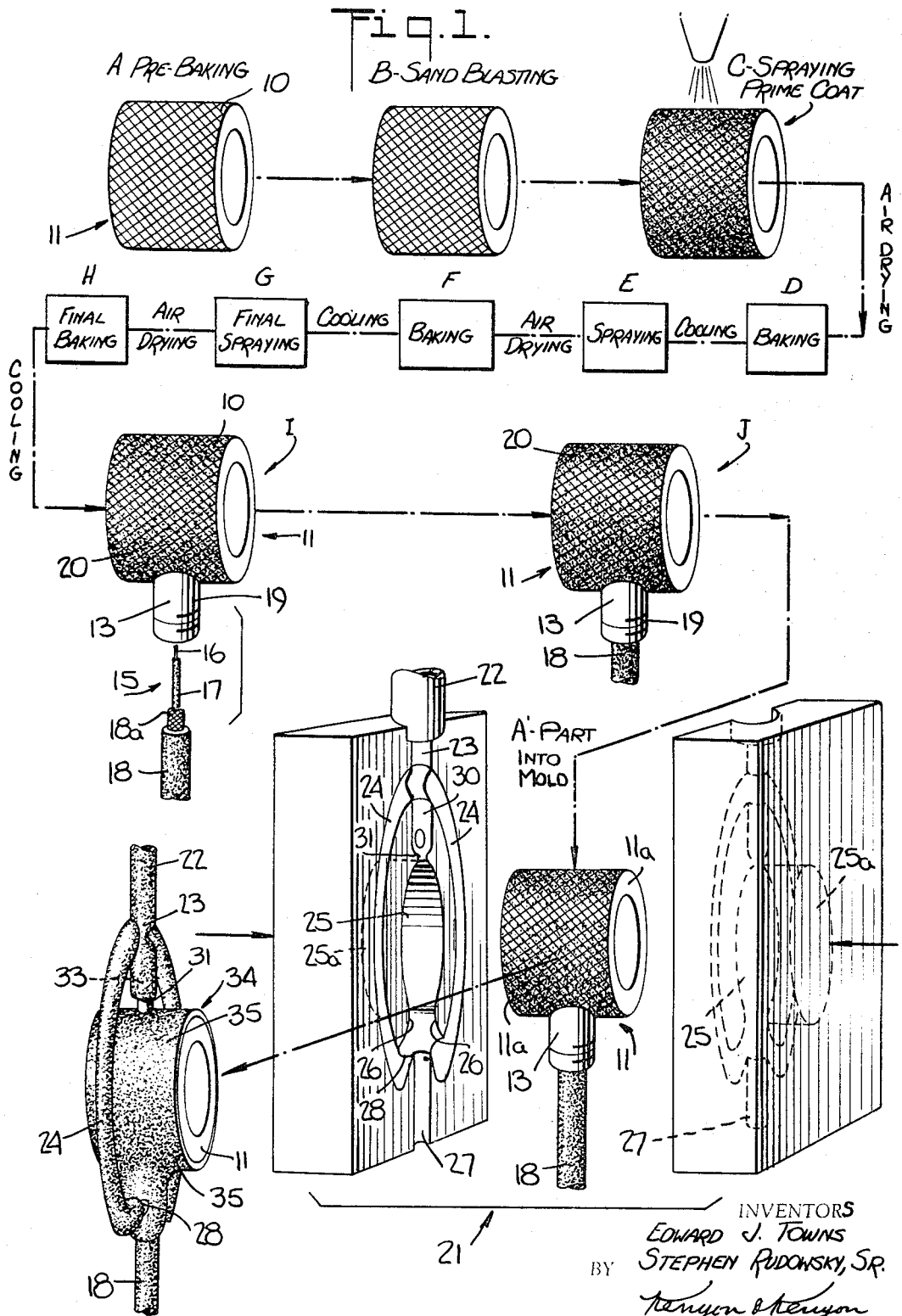

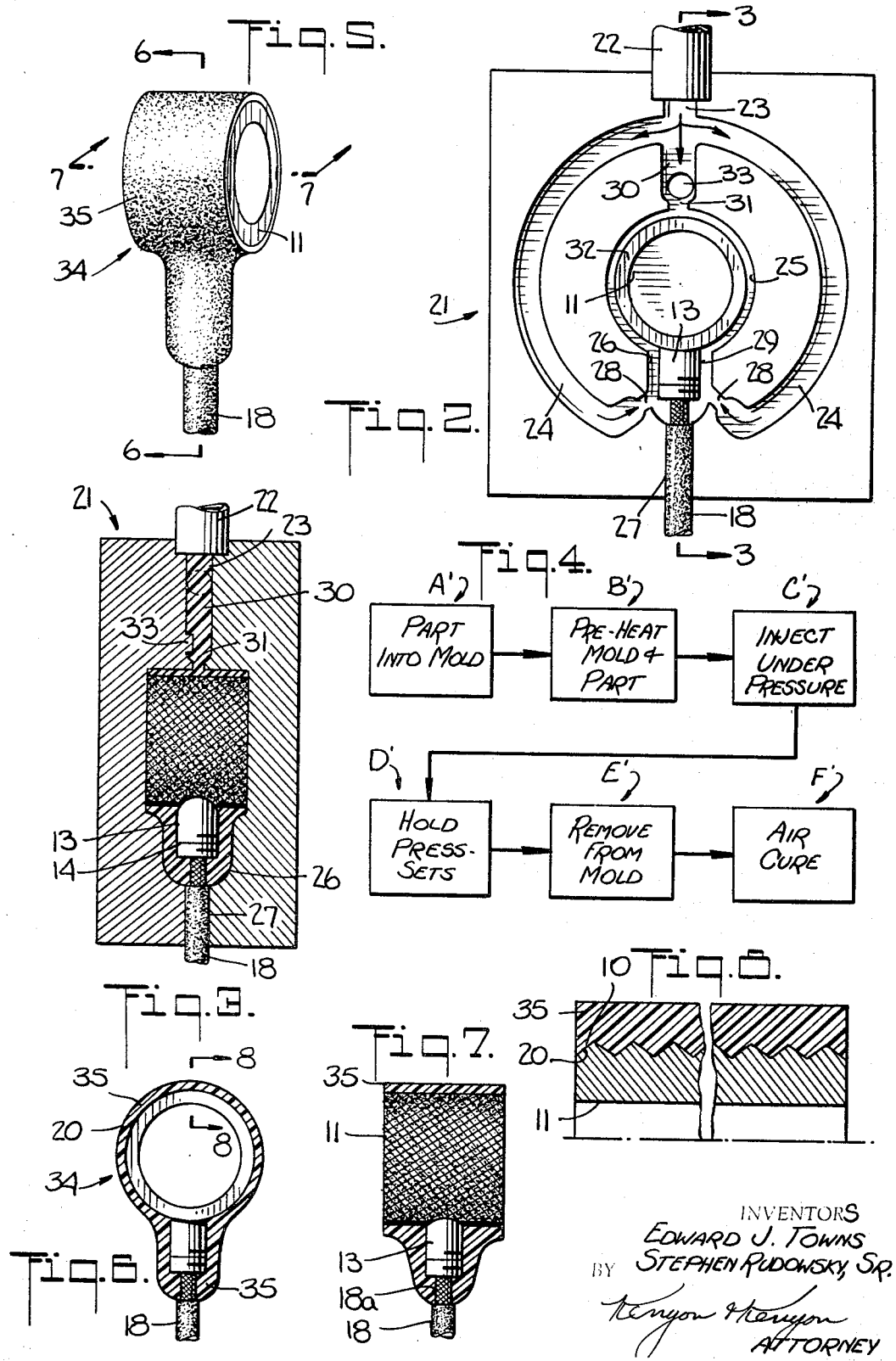

Edward J. Towns, 53 Mount Haven Drive, Livingston, N.J. 07039, and Stephen Rudowsky, Sr., Pine Brook Road, Towaco, N.J. 07082
Filed June 15, 1964, Ser. No. 374,977
10 Claims. (Cl. 156—245)

ABSTRACT OF THE DISCLOSURE

A process is described for applying a layer of FEP-fluorocarbon resin to an article by coating the article with a film of FEP-fluorocarbon resin and molding a layer of FEP-fluorocarbon resin to the film coated on the article. Also disclosed is an article to which the above-described process has been applied after first applying a film of TFE-fluorocarbon to the article.

---

This invention relates to the bonding of fluorocarbon resin material to the surface of an article and more in particular to the bonding of fluorocarbon resin material to an article, by means of injection molding.

Fluorocarbon resin materials have a combination of chemical and physical properties which are practically unobtainable in any other single resin material. For example, fluorocarbon resins have properties of extreme resistance to chemical attack, good thermal stability and high dielectric strength. Because of these properties it is desirable in many applications to coat an article with a film of fluorocarbon resin, to build up a layer of the resin upon it, or to encapsulate it with the fluorocarbon resin. Where the article alone would be subject to chemical attack, the fluorocarbon resin coating can provide a protective barrier. In other applications, it is necessary to seal an article from the entry of fluids. By way of example, articles such as electrical components may require protection and sealing from penetration by chemical materials such as fuels. More in particular, it has been found in the field of missiles that it is extremely difficult to prevent penetration and the resulting short-circuiting of electrical components such as connectors by the aromatic fuels used in rocket engines.

Fluorocarbon resins have been applied to base materials such as metal by coating the surface with resin primers and enamels or by pressure-bonding sheets of resin material to the surface upon the application of heat and pressure to the sheet material. Such techniques are generally unsuitable for the building up of a heavy coating or layer upon a surface, especially where the surface is irregular in form. In addition the applying of fluorocarbon resin material by such methods does not lend itself to mass production operations capable of providing consistent and uniform results.

It is therefore one of the objects of the invention to provide a method for bonding fluorocarbon resin to the surface of an article.

It is another object of the invention to provide a method for injection molding fluorocarbon resin to the surface of an article.

It is an additional object of the invention to provide a method for bonding fluorocarbon resin to an article which has been coated to receive the resin.

It is a further object of the invention to provide a process for bonding fluorocarbon resin to the surface of an article regardless of its shape or degree of surface irregularity.

It is also an object of the invention to provide a covering of fluorocarbon resin which is adapted to seal to the surface of an article.

In one form of the process of the invention the surface of an article is initially coated with a film of fluorocarbon resin and then subsequently a layer of fluorocarbon resin is bonded to the film coating.

In another form of the process of the invention the article is initially coated with a film of fluorocarbon resin and subsequently a layer of fluorocarbon resin is injection molded onto the film coating.

In an additional form of the process of the invention the article having a film of fluorocarbon resin on the surface thereof is disposed in a mold and fluorocarbon resin is injected thereinto under predetermined conditions of temperature and pressure for a predetermined time cycle in order to bond a layer of resin to the film coating.

A further form of the invention includes a covering of fluorocarbon resin which is adapted to be sealed to the surface of an article.

Other objects and features of the invention will become apparent in the following description and claims and in the drawings in which:

FIG. 1 is a flow chart representing the steps of coating an article with a film of fluorocarbon resin and the steps of the process of the invention for molding fluorocarbon resin to the coated object;

FIG. 2 is an elevational view of the mold with the molded article disposed therein and showing the direction of flow through the gates and runners of the mold;

FIG. 3 is a vertical section view of the mold with the molded article disposed therein taken along the line 3—3 in FIG. 2;

FIG. 4 is a block diagram representation of the steps of the process of the invention of injection molding fluorocarbon resin to a coated article;

FIG. 5 is a perspective view of the molded article of the invention;

FIG. 6 is a vertical section view of the molded article of the invention taken along the line 6—6 in FIG. 5;

FIG. 7 is a vertical section view of the molded article of the invention taken along the line 7—7 in FIG. 5 and showing the interface between the resin material and the object to which it is bonded; and FIG. 8 is an enlarged fragmentary vertical section view of the molded article of the invention taken along the line 8—8 in FIG. 6 and showing the interface between the resin material and the knurled surface of the object.

In describing the method of the invention the fluorocarbon resin material is shown by way of example as being bonded to external surface 10 of the electrical connector 11 (FIG. 1). External surface 10 of the connector can be provided with knurling 12 in order to increase the area of the external surface to which the bonding is to be made. Sleeve 13 which is inserted into connector 11 contains opening 14 through which lead 15 extends. Lead 15 comprises conductor 16 which is surrounded by insulation 17. In addition lead 15 can be enclosed in jacket 18 which protects the lead from abrasion and external damage. Braid 18a disposed between insulation 17 and jacket 18 provides additional strength to the assembly and can be employed as an electrical shield. Similarly as in the case of connector 11, the external surface of sleeve 13 can be provided with a conditioned surface such as grooves 19 to improve the engagement between the molded material and the sleeve.

In order to prepare the connector for the molding operation for bonding the material about the connector, it is first necessary to provide film 20 of fluorocarbon resin which is applied to external surface 10 of the connector as shown by the preparatory process represented in FIG. 1. Connector 11 is initially heated or prebaked in accordance with Step A to an elevated temperature in order to drive off any contaminating materials on the surface of the connector. The part is then additionally cleaned as shown in Step B by sandblasting or the like. Following the sandblasting, the connector is subjected to a prime coat or spray of fluorocarbon resin material on its external surface as shown in Step C of FIG. 1. After the spraying of the prime coat in Step C, the connector is left to air-dry and then is baked at an elevated temperature as shown in Step D. After cooling the connector is again sprayed with another coat of fluorocarbon resin, as shown in Step E. This is followed by another period of air-drying. Step F represents another cycle of baking at an elevated temperature. Upon cooling, the connector is subjected to a final spraying of fluorocarbon resin as shown in Step G. The first baking is shown as Step H. After cooling the connector is then ready for assembly with sleeve 13 and lead 15 as shown by Step I.

In the prime coat spraying of Step C, TFE (polytetrafluoroethylene)-fluorocarbon resin is employed. TFE-fluorocarbon resin is the high polymer of tetrafluoroethylene created by polymerization under carefully controlled conditions. The spray coatings of Steps E and G are of FEP (fluorinated ethylene propylene)-fluorocarbon resin which is a copolymer of tetrafluoroethylene and hexafluoropropylene.

By way of example connector 11, fabricated from metal, is being prepared for the subsequent injection molding bonding process in the following manner:

Step A—Prebaking at 700° F. for 10 minutes;
Step B—Sandblasting the external surface of the connector;
Step C—Spraying with Green Prime TFE #850–204 "Teflon" (a product of E. I. du Pont de Nemours & Company) and followed with air-drying;
Step D—Baking at 700° F. for 10 minutes and followed by cooling;
Step E—Spraying with FEP #856–204 "Teflon" (a product of E. I. du Pont de Nemours & Company) followed by air-drying;
Step F—Baking at 650 to 720° F. for 20 minutes and followed by cooling;
Step G—Again spraying with FEP #856–204 "Teflon" followed by air-drying; and
Step H—Final baking at 650 to 725° F. for 20 minutes and followed by cooling.

As shown in Step I of FIG. 1, connector 11 having film 20 applied thereto is assembled with lead 15 by inserting the lead into sleeve 13 until jacket 18 enters into the opening in the sleeve. The connector and lead assembly is shown in Step J of FIG. 1 as completed prepared for the injection molding process.

In accordance with Step A of the injection molding process of the invention (FIG. 4), connector 11 is inserted into split mold 21 of an injection molding machine (not shown). The cylinder of the injection molding machine is connected to sprue 22 which leads through gate 23 to runners 24. The mold contains cavities 25 which are adapted to receive connector 11. When the mold is closed about connector 11, the connector is positioned concentrically with respect to cavities 25 and is clamped in the concentric position by the engagement of end surfaces 25a of the cavities with respect to ends 11a of the connector. Extending from cavities 25 are relieved portions 26 which receive sleeve 13 of the connector (FIGS. 1, 2 and 3). Channels 27 extending from relieved portions 26 provide the necessary clearance for jacket 18 of lead 15. The channels are adapted to clamp tightly about jacket 18 when the mold is closed in order to prevent the leakage of resin material from relieved portions 26 downwardly along jacket 18 of the lead.

As shown in FIG. 2, constrictions 28 are provided at the end portions of runners 24 in order to control the flow of the resin into clearance 29 formed between relieved portions 26 and sleeve 13. In FIG. 2, the arrows indicate the direction of flow of the fluorocarbon resin material during the injection molding cycle. A portion of the flow passes from gate 23 into runner 30 which in turn passes the flow of resin through constriction 31 into clearance 32 formed between external surface 10 of the connector and the inner surfaces of cavities 25. Thus it can be seen that the resin flows not only from runner 30 into clearance 32 but also from clearance 29. In order to prevent the flow of resin passing through runner 30 from being excessive with respect to the flow of resin entering from clearance 29, runner 30 can be provided with additional constriction 33 disposed within runner 30 which reduces its cross section. The various constrictions serve the additional purpose of retarding the flow of resin into the clearances surrounding the connector so that the flow does not tend to move the connector with respect to the mold during the injecting cycle.

As shown in the block diagram of FIG. 4, Step A includes the placing of the article or connector 11 into mold 21. Mold 21 is heated to a level of about 400–500° F. in order to insure that the molded part ultimately has a good surface. Preferably the temperature of the die prior to injection should be in a range of about 480 to about 495° F. When the mold is closed about the connector, the connector is preheated by the transfer of heat to it from the mold. The time of preheating which varies in accordance with the mass of the article can be in the order of one minute. The part or connector can be heated to an elevated level prior to insertion into the mold in order to shorten the duration of the step of preheating shown as B' in FIG. 4.

Prior to injection, the FEP-fluorocarbon resin in the cylinder of the injection molding machine is heated into the range of approximately 700 to 750° F. During Step C' of injecting the resin into mold 21, there is a certain drop of temperature during passage of the resin through the discharge port of the injecting cylinder and sprue 22. As injection takes place, the pressure of the ram upon the resin can be in the range extending upwardly from about 5000 p.s.i. The lowest pressure which can completely inject the viscous resin generally is the preferred pressure since it is accompanied by the most satisfactory bond. Following the injection of the resin the ram is held under pressure in order to maintain the pressure on the mold for a period of time in accordance with Step D'. This period enables the resin to solidify under pressure. During Step D of being held under pressure, the temperature of the resin decreases and it sets. After the hold period, molded article 34 (FIG. 1) is removed from mold 21 in accordance with Step E'.

As shown in FIG. 1, molded article 34 upon removal from mold 21 has connected to it the various runners and gates by which the resin was molded about connector 11. In the final Step F' of the process of the invention, the molded article is allowed to cure. Subsequently the runners and gates are cut away from molded material 35 surrounding outer surface 10 of the connector and the outer surface of sleeve 13. FIG. 5 shows molded article 34 after the removal of the gates and runners. By way of example in bonding fluorocarbon resin to an article coated with a film of fluorocarbon resin, the injection molding process can include the following steps:

Step A'—Inserting the part into the mold;
Step B'—Closing the mold about the part and holding the part for a period of about one minute in order to preheat the part approximately to the mold temperature of about 490° F.;
Step C'—Injecting FEP-"Teflon" 100 (a product of E. I. du Pont de Nemours & Company) into the mold at a temperature of about 610° F. with a pressure of about 8000 p.s.i.;
Step D'—Holding the pressure on the mold for a period of about 15 to 30 seconds;
Step E'—Releasing the pressure on the mold and maintaining the mold closed for a period of about 45 seconds; and Step F'—Air-cooling the part and permitting it to cure.

As shown in FIGS. 3, 6 and 7, molded material 35 not only bonds to film 20 disposed about the external surface of the connector but also incapsulates sleeve 13. The fact that the molded material is bonded to the film throughout the complete circumference of the connector prevents any penetration of foreign material, such as liquid chemicals, into the region between the molded material and the connector. In the area of sleeve 13, it should be noted that jacket 18 being of FEP-fluorocarbon resin is melted and integrated with molded material 35 during the injection molding process. The result of this is shown in FIGS. 3, 6 and 7. The molded material extends directly to braid 18a underlying jacket 18. By bonding to the braid and enclosing sleeve 13, entry of foreign material along jacket 18 and into the connector is prevented.

While there has been shown what is considered to be preferred embodiments of the invention, it is to be understood that changes and modifications may be made therein without departing from the essential spirit of the invention. It is intended therefore in the annexed claims to cover all such changes and modifications as fall within the true scope of the invention.

What is claimed is:

1. A process for applying a layer of FEP-fluorocarbon resin to an article comprising the steps of applying a film of TFE-fluorocarbon resin to the surface of the article, coating the film of TFE-fluorocarbon resin with a film of FEP-fluorocarbon resin and injection molding a layer of FEP-fluorocarbon resin to the film of FEP-fluorocarbon resin coated on the article.

2. A process for molding FEP-fluorocarbon resin to an article comprising the steps of coating the article with a film of FEP-fluorocarbon resin and injection molding a layer of FEP-fluorocarbon resin onto said film coated on the article, said step of injection molding including inserting the article into a heated mold, closing the mold about the article, injecting FEP-fluorocarbon resin under pressure into the mold to form a layer of said resin on said film of resin, maintaining the mold under pressure for a period during which said layer of resin sets, releasing said pressure, holding the mold closed about the article for an additional period during which the temperature of said layer of resin decreases, and removing the article from the mold, whereby said resin injected into said mold onto said film of resin is molded to the article.

3. A process for molding FEP-fluorocarbon resin to an article comprising the steps of coating the article with a film of FEP-fluorocarbon resin and injection molding a layer of FEP-fluorocarbon resin onto said film coated on the article, said step of injection molding including heating the article, inserting the article into a heated mold, closing the mold about the article, injecting FEP-fluorocarbon resin under pressure into the mold to form a layer of said resin on said film of resin, maintaining the mold under pressure for a period during which said layer of resin sets, releasing said pressure, holding the mold closed about the article for an additional period during which the temperature of said layer of resin decreases, and removing the article from the mold, whereby said resin injected into said mold onto said film of resin is molded to the article.

4. A process for molding FEP-fluorocarbon resin to an article comprising the steps of coating the article with a film of FEP-fluorocarbon resin and injection molding a layer of FEP-fluorocarbon resin onto the film coated on the article, said step of injection molding including inserting the article into a mold heated to a temperature in the range of about 480 to about 495° F., closing the mold about the article, holding the mold closed about the article for a period of about one minute to heat the article to approximately the temperature of the mold, injecting FEP-fluorocarbon resin at a temperature in the range of about 700 to about 735° F. into the mold closed about the article, the resin being injected at a pressure of at least about 5000 p.s.i., maintaining said pressure for a period in the range of about one-half minute during which the injected resin sets, releasing said pressure, maintaining the mold closed about the object for a period during which the temperature of the injected resin decreases, and removing the article from the mold, whereby the resin injected into the mold onto the film of resin is molded to the article.

5. A process for molding FEP-fluorocarbon resin to an article comprising the steps of coating the article with a film of FEP-fluorocarbon resin and injection molding a layer of FEP-fluorocarbon resin onto the film coated on the article, said step of injection molding including inserting the article in a mold heated to a temperature in the range of about 480 to about 495° F., closing the mold about the article, holding the mold closed about the article for a period of about one minute to heat the object to approximately the temperature of the mold, injecting FEP fluorocarbon resin at a temperature in the range of about 700 to about 735° F. into the mold closed about the article, the resin being injected at a pressure of about 8000 p.s.i., maintaining said pressure for a period in the range extending from about 15 to about 30 seconds, releasing said pressure, maintaining the mold closed about the article for a period of about 45 seconds, and removing the article from the mold, whereby the resin injected into the mold forms a layer which is bonded to the film of resin coated on the article.

6. A process for molding FEP-fluorocarbon resin to an article comprising the steps of coating the article with a film of FEP-fluorocarbon resin and injection molding a layer of FEP-fluorocarbon resin onto the film coated on the article, said step of injection molding including inserting the article into a mold heated to about 490° F., closing the mold about the article, holding the mold closed about the article for a period of about one minute to heat the article to approximately the temperature of the mold, injecting FEP-fluorocarbon resin into the mold closed about the article, the resin upon entering the mold being at a temperature of about 610° F. and at a pressure of about 8000 p.s.i., maintaining said pressure for a period in the range extending from about 15 to about 30 seconds, releasing said pressure, maintaining the mold closed about the article for a period of about 45 seconds, and removing the article from the mold, whereby the resin injected into the mold forms a layer which is bonded to the film of resin coated on the article.

7. A process for molding FEP-fluorocarbon resin to an article comprising the steps of coating the article with a film of FEP-fluorocarbon resin and injection molding a layer of FEP-fluorocarbon resin onto the film coated on the article, said injection molding including the steps of inserting the article in a mold heated to about 490° F., closing the mold about the article, holding the mold closed about the article for a period of about one minute to heat the article to approximately the temperature of the mold, injecting FEP-fluorocarbon resin into the mold closed about the article, the resin being injected at a temperature of about 610° F. and at a pressure of about 8000 p.s.i., maintaining said pressure for a period in the range extending from about 15 to about 30 seconds, releasing said pressure, maintaining the mold closed about the article for a period of about 45 seconds, removing the article from the mold, and curing the injected resin, whereby the resin injected into the mold forms a layer which is bonded to the film of resin coated on the article.

8. In a process for molding FEP-fluorocarbon resin to an article having a film of FEP-fluorocarbon coated thereon, said film being coated by the process of heating the article to an elevated temperature to remove foreign material from the article, conditioning the surface of the article to receive the coating, spraying the surface with a film of TFE-fluorocarbon resin, drying the film of resin sprayed thereon, baking the film of resin, cooling the article after baking, spraying the film of TFE-fluorocarbon resin with at least one film of FEP-fluorocarbon resin, drying each of said films of FEP-fluorocarbon resin, after the spraying thereof, baking each of said films of FEP-fluorocarbon resin after the baking thereof, cooling the article after the baking of each of said films of FEP-fluorocarbon resin, said process for molding FEP-fluorocarbon resin to a film of FEP-fluorocarbon resin coated on an article comprising the steps of inserting the article in a heated mold, closing the mold about the article, holding the mold closed about the article for a period to heat the article to approximately the temperature of the mold, injecting FEP-fluorocarbon resin under pressure into the mold closed about the article, maintaining said pressure for a period during which the injected resin sets, releasing said pressure, maintaining the mold closed about the article for an additional period during which the temperature of the injected resin decreases, and removing the article from the mold, whereby the resin injected into the mold forms a layer which is bonded to the film of resin coated on the article.

9. In a process for molding FEP-fluorocarbon resin to an article having a film of FEP-fluorocarbon coated thereon, said film being coated by the process of heating the article to an elevated temperature to remove foreign material from the article, conditioning the surface of the article to receive the coating, spraying the surface with a film of TFE-fluorocarbon resin, drying the film of resin sprayed thereon, baking the film of resin, cooling the article after baking, spraying the film of TFE-fluorocarbon resin with a film of FEP-fluorocarbon resin, drying the film of FEP-fluorocarbon resin, baking the film of FEP-fluorocarbon resin, cooling the article, spraying the film of FEP-fluorocarbon resin with an additional film of FEP-fluorocarbon resin, baking the additional film of FEP-fluorocarbon resin, and cooling the article, said process for molding FEP-fluorocarbon resin to a film of FEP-fluorocarbon resin coated on an article comprising the steps of inserting the article in a heated mold, closing the mold about the article, holding the mold closed about the article for a period to heat the article to approximately the temperature of the mold, injecting FEP-fluorocarbon resin under pressure into the mold closed about the article, maintaining said pressure for a period during which the injected resin sets, releasing said pressure, maintaining the mold closed about the article for an additional period during which the temperature of the injected resin decreases, and removing the article from the mold, whereby the resin injected into the mold forms a layer which is bonded to the film of resin coated on the article.

10. In a process for molding FEP-fluorocarbon resin to an article having a film of FEP-fluorocarbon coated thereon, said film being coated by the process of heating the article to a temperature of about 700° F. for a period of about 10 minutes, sandblasting the surface of the article to receive the coating, spraying the surface with TFE-fluorocarbon resin, drying the resin sprayed thereon, heating the article to a temperature of about 700° F. for a period of about 10 minutes, cooling the article, spraying the film of TFE-fluorocarbon resin with a film of FEP-fluorocarbon resin, drying the film of FEP-fluorocarbon resin, heating the article to a temperature in the range extending from about 650 to about 725° F. for a period of about 20 minutes, cooling the article, spraying the film of FEP-fluorocarbon resin with an additional film of FEP-fluorocarbon resin, heating the article to a temperature in the range extending from about 650 to about 680° F. for a period of about 20 minutes, and cooling the article, said process for molding FEP-fluorocarbon resin to a film of FEP-fluorocarbon resin coated on an article comprising the steps of inserting the article in a mold heated to about 490° F., closing the mold about the article, holding the mold closed about the article for a period of about one minute to heat the article to approximately the temperature of the mold, injecting FEP-fluorocarbon resin into the mold closed about the object, the resin being injected into the mold at a temperature of about 610° F. and at a pressure of about 8000 p.s.i., maintaining said pressure for a period in the range extending from about 15 to about 30 seconds, releasing said pressure, maintaining the mold closed about the article for a period of about 45 seconds, and removing the article from the mold, whereby the resin injected into the mold forms a layer which is bonded to the film of resin coated on the article.

References Cited
UNITED STATES PATENTS

| | | | |
|---|---|---|---|
| 2,989,433 | 6/1961 | Yuan | 156—313 |
| 3,018,188 | 1/1962 | Nicoll | 117—38 |
| 3,122,598 | 2/1964 | Berger | 264—328 X |
| 3,196,194 | 7/1965 | Ely et al. | 264—95 |
| 3,242,246 | 3/1966 | Stand | 264—328 X |
| 3,246,066 | 4/1966 | Gits | 264—328 X |

EARL M. BERGERT, *Primary Examiner.*

HAROLD ANSHER, *Examiner.*